（12） United States Patent
Sohn et al.

(10) Patent No.: US 9,190,640 B2
(45) Date of Patent: Nov. 17, 2015

(54) COVER OPENING AND CLOSING APPARATUS FOR ELECTRONIC APPLIANCES

(71) Applicant: Samsung Electronics Co., Ltd., Suwon-si, Gyeonggi-do (KR)

(72) Inventors: Young-Wook Sohn, Seoul (KR); Seung-Soo Chung, Seoul (KR); Jong-Chul Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/294,685

(22) Filed: Jun. 3, 2014

(65) Prior Publication Data

US 2014/0354879 A1   Dec. 4, 2014

(30) Foreign Application Priority Data

Jun. 3, 2013  (KR) .................. 10-2013-0063408

(51) Int. Cl.
*H04N 5/225*  (2006.01)
*H01M 2/10*  (2006.01)

(52) U.S. Cl.
CPC ........... *H01M 2/1022* (2013.01); *H04N 5/2252* (2013.01); *H01M 2220/30* (2013.01)

(58) Field of Classification Search
None
See application file for complete search history.

(56) References Cited

FOREIGN PATENT DOCUMENTS

| JP | 2004-066530 A | 3/2004 |
| KR | 10-0263656 B1 | 5/2000 |
| KR | 10-2003-0093833 A | 12/2003 |

*Primary Examiner* — Roberto Velez
*Assistant Examiner* — Yih-Sien Kao
(74) *Attorney, Agent, or Firm* — Jefferson IP Law, LLP (57) ABSTRACT

A cover opening and closing apparatus of an electronic appliance is provided. The apparatus includes a body comprising a container-shaped housing with an open side configured to insert and remove at least one electronic component, a cover configured to open and close an opening of the housing, and a moving hinge hinged to the cover, received in the body, and movable. When the cover rotates over a threshold angle, the cover rotates on a rotation axis being a protrusion contacting the body and a hinge connector between the cover away from the rotation axis and the moving hinge moves out of the body.

18 Claims, 8 Drawing Sheets

COVER OPENING AND CLOSING APPARATUS FOR ELECTRONIC APPLIANCES

CROSS-REFERENCE TO RELATED APPLICATION(S)

This application claims the benefit under 35 U.S.C. §119 (a) of a Korean patent application filed on Jun. 3, 2013 in the Korean Intellectual Property Office and assigned Serial number 10-2013-0063408, the entire disclosure of which is hereby incorporated by reference.

TECHNICAL FIELD

The present disclosure relates to a cover opening and closing apparatus of an electronic appliance, which is used to attach or detach an electronic component such as battery or memory card.

BACKGROUND

In accordance with advances in electronic communication industries, electronic appliances such as a cellular phone, a digital organizer, a personal digital assistant, a digital camera, and an electric shaver have become widely used. Such an electronic appliance includes a battery as a power source. In some electronic appliances, it is necessary to include a separate a case to exchange the battery. Most of the electronic appliances include a battery cover used to allow the battery's insertion and removal from the case.

Accordingly, an apparatus and method to increase an opening angle of a cover is required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method to increase an opening angle of a cover.

Another aspect of the present is to reduce disturbance caused by a cover when a battery is attached or detached by increasing an opening angle of the cover.

Another aspect of the present disclosure is to prevent cover breakage by increasing an opening angle of the cover.

Another aspect of the present disclosure is to enhance opening of a cover.

In accordance with an aspect of the present disclosure, a cover opening and closing apparatus of an electronic appliance is provided. The cover opening and closing apparatus includes a body comprising a container-shaped housing with an open side configured to insert and remove at least one electronic component, a cover configured to open and close an opening of the housing, and a moving hinge hinged to the cover, received in the body, and movable. When the cover rotates over a threshold angle, and a hinge connector between the cover away from the rotation axis and the moving hinge moves out of the body.

In accordance with another aspect of the present disclosure, a battery cover opening and closing apparatus of an electronic appliance is provided. The battery cover opening and closing apparatus includes a body comprising a container-shaped battery housing with an open top side, and a container-shaped hinge housing disposed beside the battery housing with an open top side, a battery cover configured to open and close an opening of the battery housing, and lock the opening of the battery housing, a hinge cover coupled to an opening of the hinge housing and forming a gate by joining the opening of the hinge housing, a moving hinge hinged to the battery cover, the moving hinge gliding along a round bottom of the hinge housing, and bending circularly along a movement direction, a first shaft for hinge-connecting the battery cover and the moving hinge, a second shaft penetrating the moving hinge, the second shaft protruding to either side of the moving hinge with either end, and disposed in parallel with the first shaft, and a tension spring secured to a spring connection hook formed in a side of the hinge housing with one end, and secured to the second shaft penetrating a spring connection groove opened to one side in the moving hinge with the other end. The hinge housing includes an open hole formed lengthwise in a movement direction of the moving hinge at either side standing upright from the bottom, either end of the second shaft is disposed in the open hole and moved under guidance of the open hole, and when the battery cover rotates over a threshold angle, the battery cover rotates on a rotation axis being a protrusion of the body, a hinge connector between the battery cover away from the rotation axis and the moving hinge rotates on the rotation axis and moves out through the gate, and the moving hinge connected to the hinge connector is moved according to tension of the tension spring.

In accordance with another aspect of the present disclosure, an electronic device including a removable electronic component is provided. The electronic device includes a body including a housing configured to receive the removable electronic component, a cover configured to open and close over the housing, the cover in a closed position covering the removable electronic component, and an extensible hinge configured to rotate the cover up to 180°, the extensible hinge formed in a semicircular shape attaches at a rotation point to the cover on one end and a tension spring on another end. When the cover is in one of a closed position and rotated around the rotation point to an open position of 90° or less, the extensible hinge is held fully retracted by the tension spring attached on another end to the body. When the cover is rotated around the rotation point to an open position beyond 90°, the extensible hinge extends out of the body along a track corresponding to the semicircular shape of the extensible hinge, the tension spring applying increased tension on the extensible hinge as the extensible hinge is extended.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
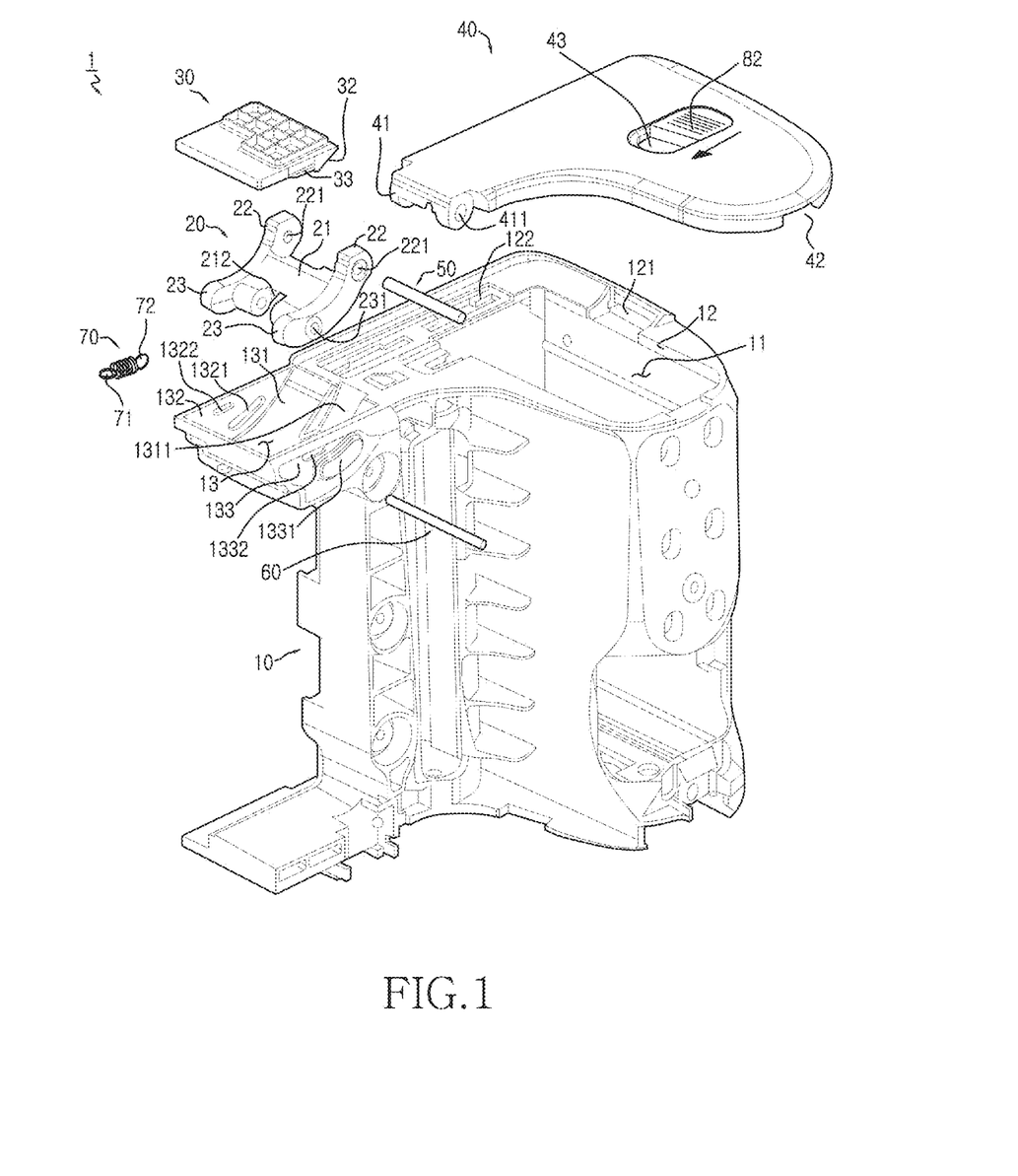
FIGS. 1 and 2 are perspective views of a cover opening and closing apparatus according to an embodiment of the present disclosure.
Figure 2:
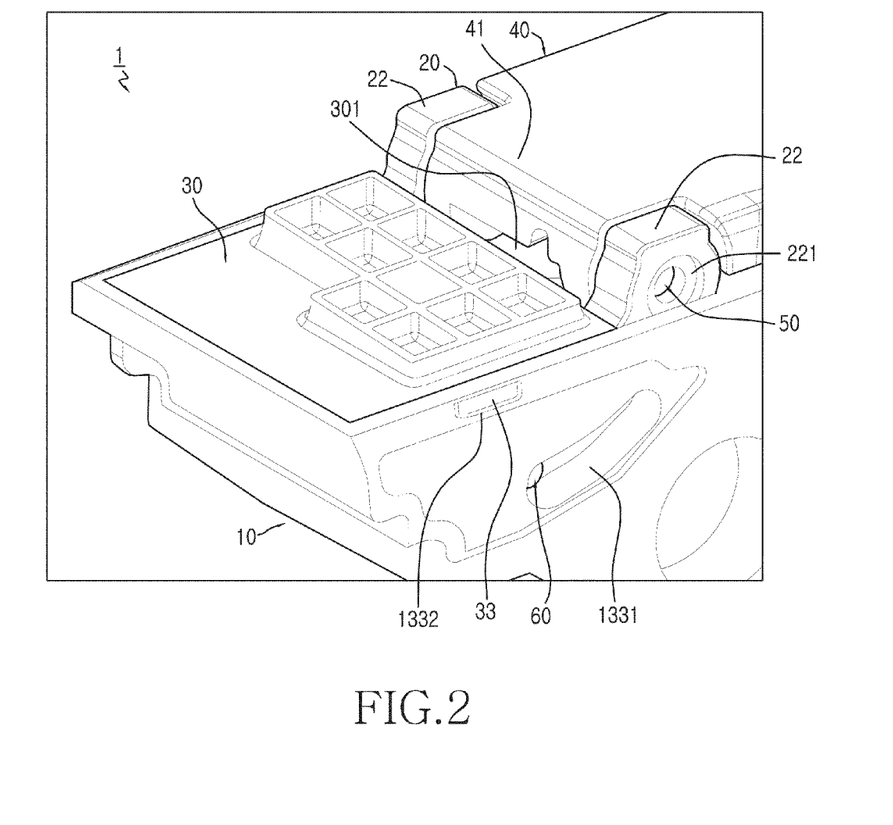
Figure 3:
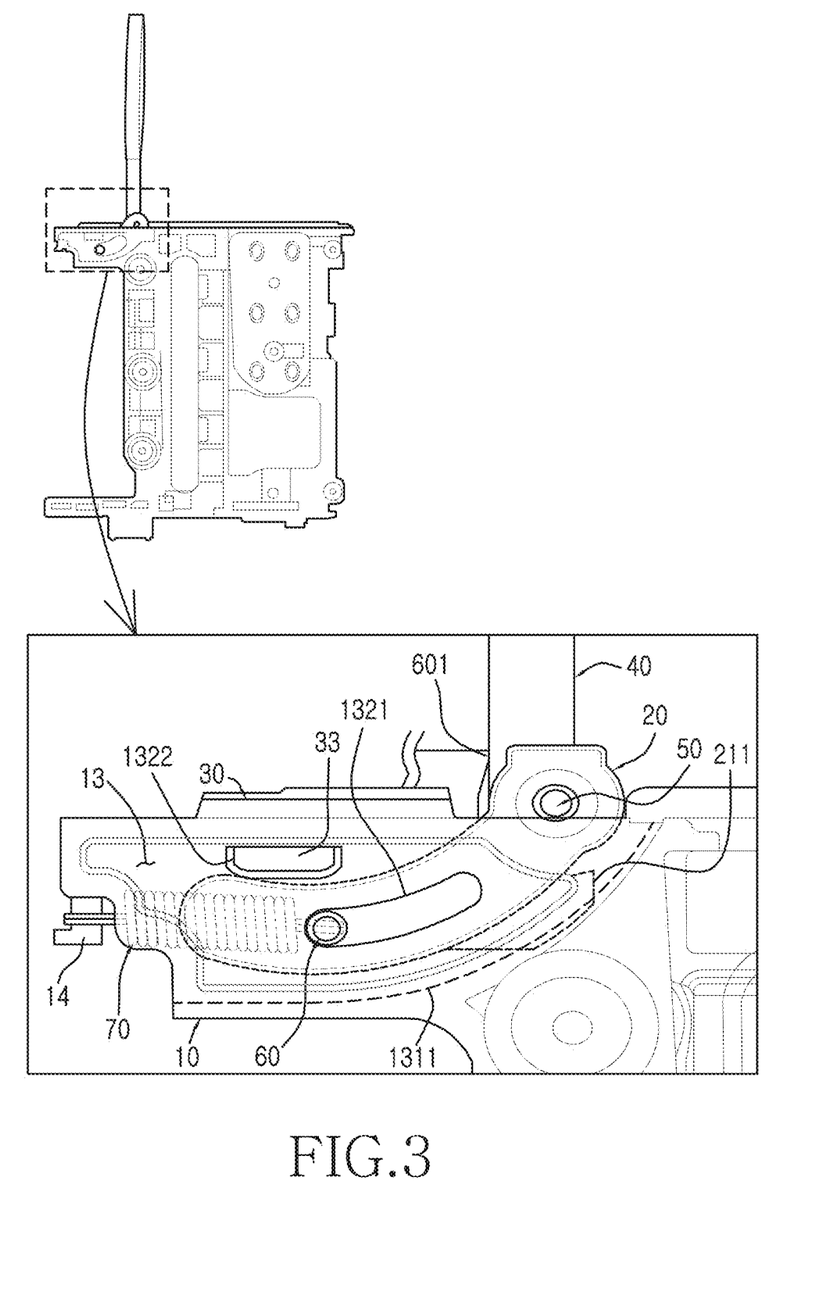
FIGS. 3 and 4 are views of operations of a cover opening and closing apparatus according to an embodiment of the present disclosure.
Figure 4:
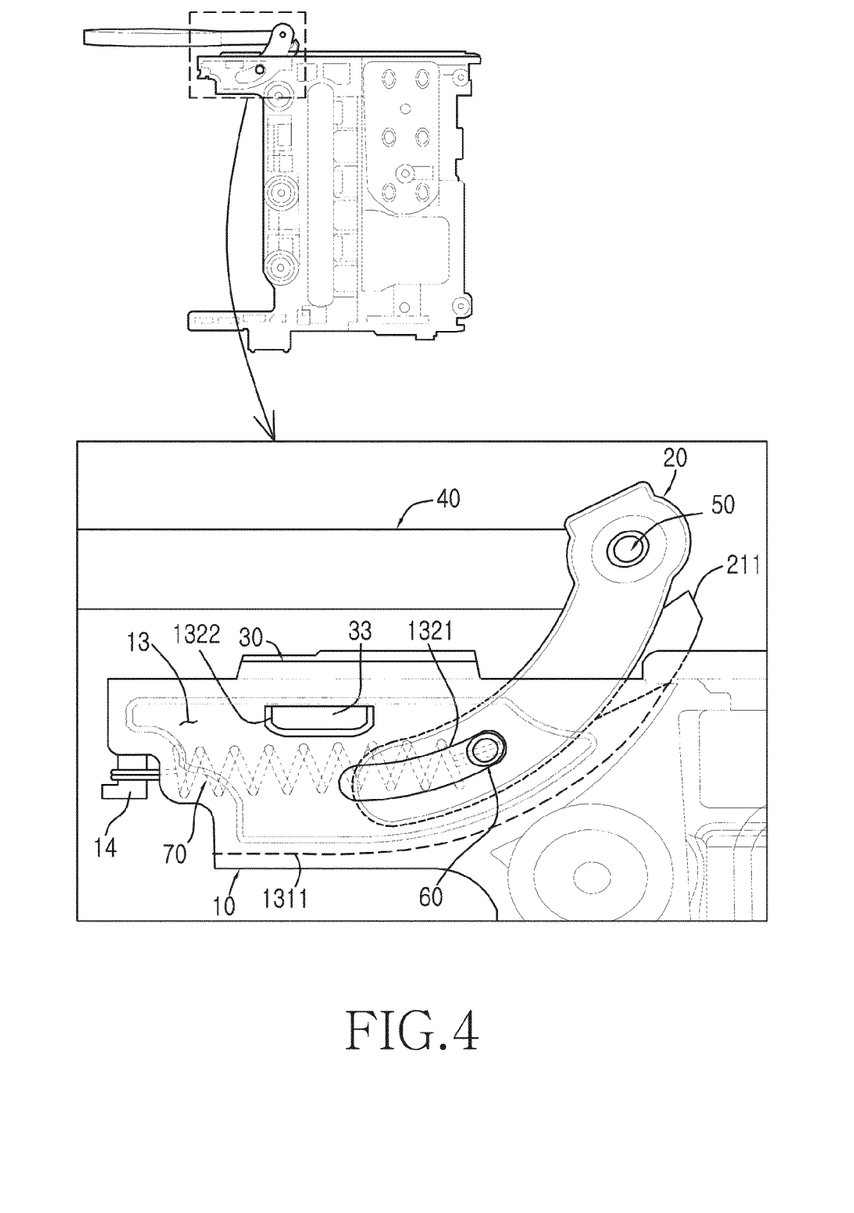

FIG. 1 is an exploded view of a cover opening and closing apparatus according to an embodiment of the present disclosure, and FIG. 2 is a perspective view of a cover opening and closing apparatus according to an embodiment of the present disclosure. FIGS. 3 and 4 depict operations of the cover opening/closing apparatus according to an embodiment of the present disclosure.

Referring to FIGS. 1, 2, 3 and 4, the cover opening and closing apparatus 1 may include a body 10, a moving hinge 20, a hinge cover 30, a cover 40, a first shaft 50, a second shaft 60, and a tension spring 70.

The body 10 may secure and support internal electronic components (e.g., Printed Circuit Board (PCB), lens). The body 10 may include at least one first housing 11 for accommodating at least one electronic component (e.g., battery or memory card) in a container shape of an open top side. An opening 12 of the first housing 11 may include fixing grooves 121 and 122 hooked to the cover 40. The body 10 may include a second housing 13 (hereafter, referred to as a hinge housing) which may accommodate the moving hinge 30 and is formed in a container shape with an open top side. A bottom 131 (gliding surface) of the hinge housing 13 may be round. The bottom 131 of the hinge housing 13 may include a guide groove 1311 formed lengthwise in a certain width along a gliding direction of the moving hinge 20. Either side 132 and 133 standing upright from the bottom 13 of the hinge housing 13 may include open holes 1321 and 1331 formed lengthwise in a certain width along the gliding direction of the moving hinge 20. A spring connection hook 14 may be formed in a side of the hinge housing 13. An opening of the hinge housing 13 may include hook fixing grooves 1322 and 1332.

The moving hinge 20 may be received and moved in the hinge housing 13 of the body 10. The moving hinge 20 may bend along a moving direction of the moving hinge 20. A bottom of the moving hinge 20 is round to contact the bottom 131 of the hinge housing 13 of the body 10, and may glide over the bottom 131 of the hinge housing 13. The moving hinge 20 may include a center portion 13, and a pair of hinge arms 22 and a pair of shaft arms 23 which protrudingly extend from either side of the center portion 21 in either gliding direction of the moving hinge 20. A guide protrusion 211 may be formed in the bottom 21 of the center portion 21 of the moving hinge 20. The guide protrusion 211 may be inserted to the guide groove 1311 of the body 10 and guided by the guide groove 1311 of the body 10. The moving hinge 20 may include a first shaft hole 221 for penetrating the pair of the hinge arms 22. The moving hinge 20 may include a second shaft hole 231 for penetrating the pair of the shaft arms 23. The center portion 21 of the moving hinge 20 may include a spring connection groove 212 with an open side. The second shaft hole 231 may communicate with the spring connection groove 212.

The hinge cover 30 may be coupled to an opening of the hinge housing 13 of the body 10. The hinge cover 30 is of a size that does not totally cover the opening of the hinge housing 13. When the hinge cover 30 and the hinge housing 13 of the body 10 are coupled together, a gate 301 may be formed such that the moving hinge 20 enter and exit. A lower surface 32 near the gate 301 of the hinge cover 30 is round. Hence, the moving hinge 20 may smoothly glide between the bottom 131 of the hinge housing 13 and the lower surface 32 of the hinge cover 30 without clearance, and the movement of the moving hinge 20 may attain mechanical ruggedness. The hinge cover 30 may include hooks 33 hooked to the fixing grooves 1322 and 1332 of the opening of the hinge housing 13 of the body 10.

The cover 40 is fitted into the opening 12 of the first housing 11 to thus cover the opening 12 of the first housing 11. A side of the cover 40 may include a hinge arm 41 which is hinged to the pair of the hinge arms 22 of the moving hinge 20. The hinge arm 41 of the cover 40 may include a shaft hole 411 disposed between the hinge arms 22 of the moving hinge 20 and communicating with the first shaft hole 221 of the pair of the hinge arms 22 of the moving hinge 20. The cover 40 may include through holes 42 in a side. The cover 40 may include an open hole 43 penetrating a top side and a bottom side.

The first shaft 50 may penetrate the pair of the hinge arms 22 of the moving hinge 20 and the hinge arm 41 of the cover 40, and the moving hinge 20 and the cover 40 may be hinge-connected. A torsion spring (not illustrated) may be disposed in the hinge connector between the cover 40 and the moving hinge 20. When the cover 40 is unlocked from the opening 12 of the first housing 11, the cover 40 may be automatically opened by the elastic support of the torsion spring.

The second shaft 60 may penetrate the pair of the shaft arms 23 and the center portion 21 of the moving hinge 20, and protrude to either side of the pair of the shaft arms 23 of the moving hinge 20. The second shaft 60 may be disposed in parallel with the first shaft 50, and penetrate the spring connection groove 212 of the center portion 21 of the moving hinge 20. Either end of the second shaft 60 protruding to either side of the pair of the shaft arms 23 may be disposed in the open holes 1321 and 1331 of the body 10 and guided by the open holes 1321 and 1331.

The tension spring 70 may be received in the hinge housing 13 of the body 10. One end 71 of the tension spring may be disposed in the spring connection groove 212 of the center portion 21 of the moving hinge 20, and secured to the second shaft 60. The other end 72 of the tension spring 70 may be secured to the spring connection hook 14 formed in the side of the hinge housing 13 of the body 10. When an external force is removed, the moving hinge 20 may return to the moving hinge's 20 original location according to the tension of the tension spring 70.

Referring now to FIG. 3, when a user moves a control portion 82 exposed through the open hole 43 of the cover 40 and detaches his or her hand, the cover 40 may automatically open at a certain angle (e.g., 90 degrees) based on the first shaft 50 hinge-connected to the moving hinge 20. The torsion spring disposed in the hinge connector or between the cover 40 and the moving hinge 20 may automatically rotate the cover 40.

Referring to FIG. 4, when the user further rotates the cover 40 standing upright (see FIG. 3), the cover 40 may rotate on a rotation axis 601 (see FIG. 3) being a projection contacting the body 10. Since the hinge connector between the cover 40 and the moving hinge 20 is away from the rotation axis 601, the cover 40 may rotate on the rotation axis 601 to protrude outward through the gate 301 and the moving hinge 20 connected to the hinge connector may move under the tension of the tension spring 70. The cover 40 may rotate 180 degrees, and the cover 40 rotated to 180 degrees contacts an outer surface of the body 10 and cannot rotate further.

When the user removes his or her finger from the cover 40 (see FIG. 4) rotated 180 degrees, the cover 40 may return to the position of FIG. 3. The cover 40 automatically stands upright according to the torsion spring of the hinge connector between the cover 40 and the moving hinge 20, the moving hinge 20 moves into the hinge housing 13 according to the tension spring 70, and the hinge connector between the cover 40 and the moving hinge 20 may move into the body 10. When the user further rotates the cover 40 of FIG. 3 toward the opening 12 of the body 10, the cover 40 is hooked to the opening 12 of the body 10 to cover the battery housing 11.

Figure 5A:
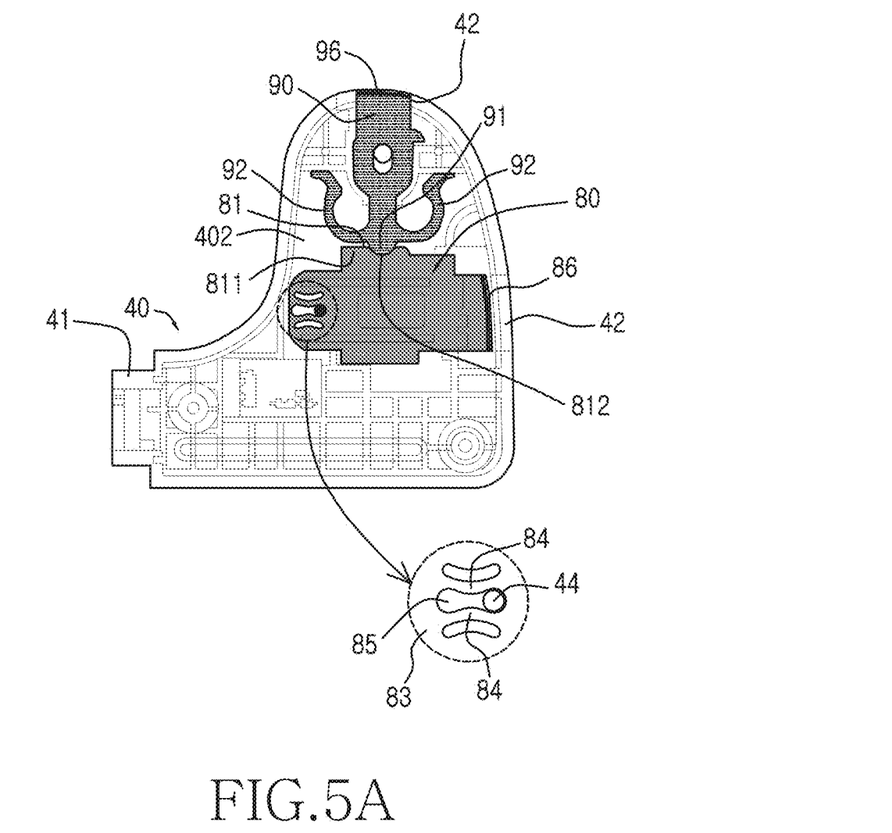
FIGS. 5A and 5B are views of a locker installed to another cover according to an embodiment of the present disclosure.
Figure 5B:
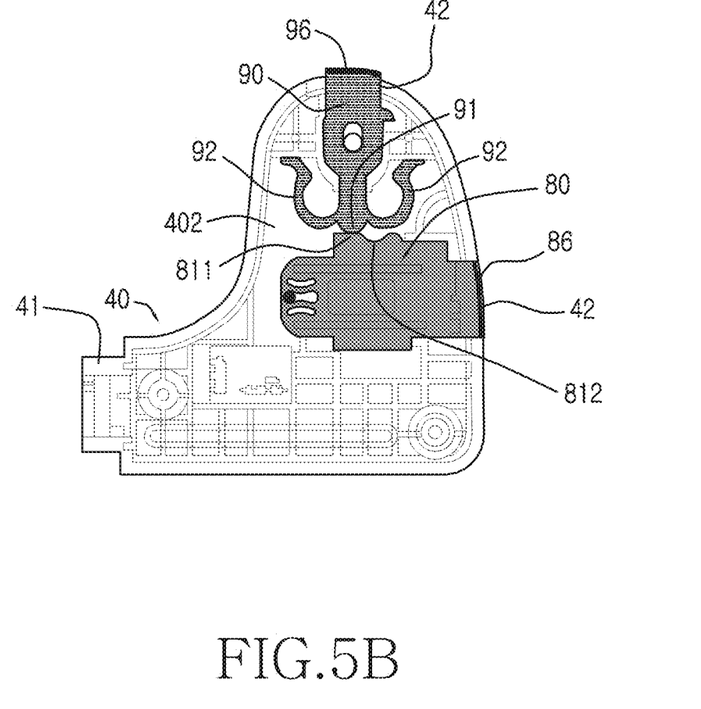

FIGS. 5A and 5B depict a locker installed to the cover according to an embodiment of the present disclosure.

Referring to FIGS. 5A and 5B, a bottom 402 of the cover 40 may include a movable cam 80 and a vertical cam 90 for cam motion. When the movable cam 80 moves straight, the vertical cam 90 may move straight by crossing (e.g., orthogonally) the movement direction of the movable cam 90. The movable cam 80 may include a smooth uneven outline 81 in a side. The vertical cam 90 may include a protrusion 91 for smoothly contacting the uneven outline 81 of the movable cam 80. The vertical cam 90 may include round elastic supports 92 extending to either side of the protrusion 91. The elastic supports 92 may exert elasticity for restoring the vertical cam 90 into the cover 40. When the movable cam 80 moves straight out of the side of the cover 40, the protrusion 91 of the vertical cam 90 contacts a convex portion 811 of the uneven outline 81 of the movable cam 80 and the vertical cam 90 may move straight out of the side of the cover 40. When the movable cam 80 moves straight into the side of the cover 40, the protrusion 91 of the vertical cam 90 contacts a concave portion 812 of the uneven outline 81 of the movable cam 80 and the vertical cam 90 may linearly move into the side of the cover 40 according to the elasticity of the elastic supports 92. The movable cam 80 may include the control portion 82 of a certain height which vertically extends to penetrate the open hole 43 of the cover 40. The user may move the movable cam 80 in the open hole 43 of the cover 40 by applying the force to the control portion 82 of the movable cam 80 exposed through the open hole 43 of the cover 40. The movable cam 80 may include an elastic fit 83 in a side. The elastic fit 83 may include a pair of elastic pieces 84 protruding to face each other and forming a circular arc. The elastic fit 83 may include a hole 85 formed lengthwise in the linear movement direction of the movable cam 80 and interposed between the elastic pieces 84. The hole 85 of the elastic fit 83 may include the relative narrow center portion. The cover 40 and include a protrusion 44 vertically extending from the bottom 42 and penetrating the hole 83 of the elastic fit 83 of the movable cam 80. When the user moves the movable cam 80 by applying the force to the control portion 82, the protrusion 44 of the cover 40 may pass the narrow portion of the hole 85 of the elastic fit 83 and the pair of the elastic pieces 84 of the movable cam 80 may elastically bend. Unless the external force is applied, the movement of the movable cam 80 may be limited by the protrusion of the cover 40 and the elastic fit 83 of the movable cam 80. The movable cam 80 and the vertical cam 90 each may include hooks 86 and 96 in their side. When the movable cam 80 and the vertical cam 90 are moved outwards from the side of the cover 40, the hooks 86 and 96 may move out of the side of the cover 40. When the cover 40 is fitted in the opening 12 of the first housing 11 of the body 10 and the movable cam 80 moves outwards from the side of the cover 40, the hooks 86 and 96 of the movable cam 80 and the vertical cam 90 may be hooked to the fixing grooves 121 and 122 of the opening 12 of the housing 11 to thus lock the cover 40.

Figure 6:
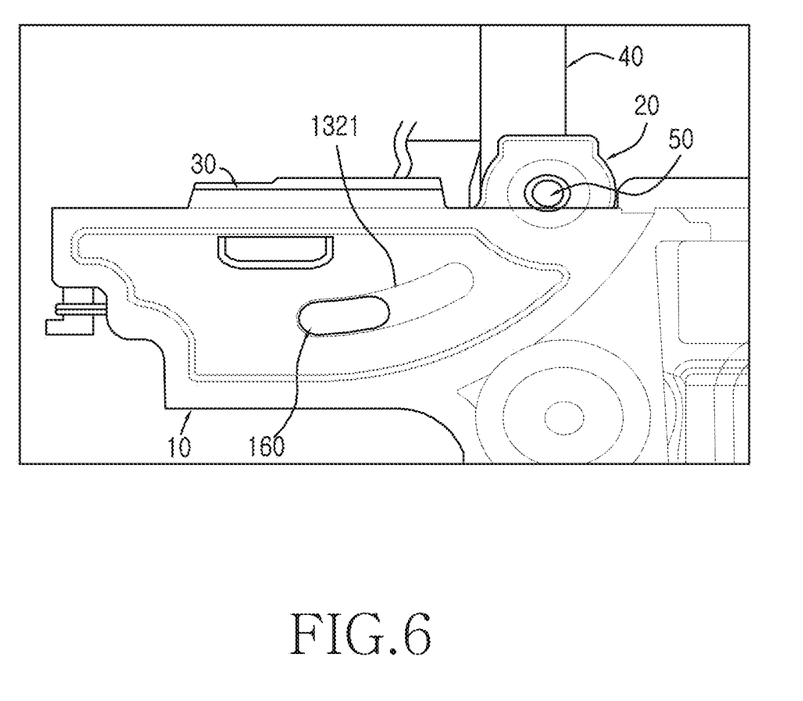
FIG. 6 is a view of a second shaft according to an embodiment of the present disclosure.

FIG. 6 depicts the second shaft according to an embodiment of the present disclosure.

Referring to FIG. 6, the second shaft 160 may penetrate the pair of the shaft arms 23 and the center portion 21 of the moving hinge 20 and protrude to either side of the pair of the shaft arms 23 of the moving hinge 20. The second shaft 160 may penetrate the spring connection groove 212 of the center portion 21 of the moving hinge 20. The ends of the second shaft 160 protruding to either side of the pair of the shaft arms 123 may be disposed in the open holes 1321 and 1331 of the body 10 and guided by the open holes 1321 and 1331. The ends of the second shaft 160 may have a cross-sectional shape partially following the path of the open holes 1321 and 1331. The second shaft 160 may be a column having the cross section partially following the path of the open holes 1321 and 1331. Hence, the second shaft 160 may reduce the gap between the moving hinge 20 and the open holes 1321 and 1331 of the hinge housing 13, and improve the mechanical ruggedness.

Figure 7:
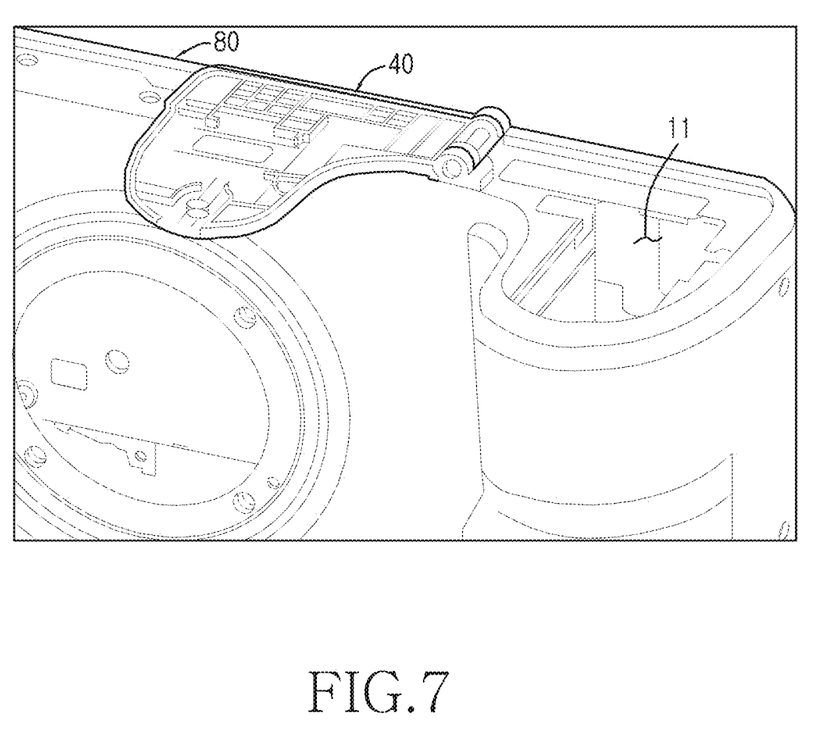
FIG. 7 is a view of a case frame and cover opening of an electronic appliance employing a cover opening and closing apparatus according to an embodiment of the present disclosure.

FIG. 7 depicts a case frame and a cover opening and closing of the electronic appliance (e.g., digital camera) employing a cover opening and closing apparatus according to an embodiment of the present disclosure. The cover opening and closing apparatus may be used to attach or detach a battery and/or a memory card. The case frame 90 may form the exterior of the digital camera. The body 10 of the cover opening and closing apparatus 1 may be a separate member coupled to the case frame 90, or part of the case frame 90.

Referring to FIG. 7, the cover 40 may rotate up to 180 degrees from the case frame 80 of the electronic appliance, and open the housing 11 for attaching or detaching the battery and/or the memory card.

According to an embodiment of the present disclosure, the cover opening and closing apparatus 1 of the electronic appliance (e.g., digital camera) may include the body 10 including the container-shaped housing 11 with the open side for inserting or drawing at least one electronic component (e.g., battery memory card), the cover 40 for opening and closing the opening 12 of the housing 11, and the moving hinge 20 hinged to the cover 40 and received in the body 10 to move. When the cover 40 rotates over a threshold angle (e.g., 90 degrees), the hinge connector between the cover 40 and the moving hinge 20 may move out of the body 10.

According to an embodiment of the present disclosure, the cover 40 rotates on the rotation axis being the protrusion 601 of the body, and the hinge connector between the cover 40 away from the rotation axis and the moving hinge 20 may rotate on the rotation axis to move out of the body 10.

According to an embodiment of the present disclosure, the moving hinge 20 may be received in the hinge housing 13 of the body 10 to slide along the round bottom 131 of the hinge housing 13.

According to an embodiment of the present disclosure, the moving hinge 20 may include the pair of the hinge arms 22 bending in the circular shape along the movement direction and protruding from either side along the gliding direction.

According to an embodiment of the present disclosure, the cover 40 may include the hinge arm 41 rotating between the hinge arms 22 of the moving hinge 20.

According to an embodiment of the present disclosure, the cover opening and closing apparatus 1 may further include the hinge cover 30 coupled to the opening of the hinge housing 13. As the opening of the hinge housing 13 and the hinge cover 30 are coupled, the gate 301 through which the hinge connector enters or exits may be formed.

According to an embodiment of the present disclosure, the lower surface 32 of the hinge cover 30 near the gate 301 may contact the moving hinge and be round.

According to an embodiment of the present disclosure, the bottom 131 of the hinge housing 13 may include the guide groove 1311 formed lengthwise in the movement direction of the moving hinge 20. The moving hinge 20 may include the guide protrusion 211 inserted to the guide groove 1311. The guide protrusion 211 may move according to the guide of the guide groove 1311.

According to an embodiment of the present disclosure, the cover opening and closing apparatus 1 may include the shaft 60 received in the hinge housing 13. The hinge housing 13 may include the open holes 1321 and 1331 formed lengthwise in the movement direction of the moving hinge 20, in either side 132 and 133 standing upright from the bottom 131. The moving hinge 20 may include the shaft hole 231 penetrating either side. The shaft 60 may penetrate the shaft hole 213, and the ends of the shaft 60 may protrude to the sides of the moving hinge 20. The ends of the shaft 60 may be disposed in the open holes 1321 and 1331 and move under the guidance of the open holes 1321 and 1331.

According to an embodiment of the present disclosure, the ends of the shaft 60 may have the cross-sectional shape partially following the path of the open holes 1321 and 1331.

According to an embodiment of the present disclosure, the cover opening and closing apparatus 1 may include the tension spring 70 received in the hinge housing 13. The moving hinge 20 may include the spring connection groove 212 with the open side to communicate with the shaft hole 213. The hinge housing 13 may include the spring connection hook 14 in the side. One end 71 of the tension spring 70 may be secured to the shaft 60 in the spring connection groove 212, and the other end of the tension spring 70 may be secured to spring connection hook 14.

According to an embodiment of the present disclosure, the hinge connector may include the torsion spring. The cover 40 is elastically supported by the torsion spring to rotate from the moving hinge 20.

According to an embodiment of the present disclosure, the cover opening and closing apparatus 1 may include the movable cam 80 and the vertical cam 90 disposed in the bottom 402 of the cover 40 and moving straight to the different sides of the cover 40 according to the cam motion. The movable cam 80 may include the control portion 82 of the certain height for vertically extending through the open hole 42 penetrating between the top and the bottom 402 of the cover 40 and moving on the open hole 43. The vertical cam 90 is elastically supported by the elastic supports 92 extending on either side, and the movable cam 80 and the vertical cam 90 may include the hooks 86 and 96 moving on the cover 40 according to the cam motion. The opening 12 of the housing 11 may include the fixing grooves 121 and 122 coupled with the hooks 86 and 96 at adequate positions.

According to an embodiment of the present disclosure, when the cover 30 rotates 180 degrees, the cover 40 contacts the outer side of the body 10 and cannot rotate further.

According to various embodiments of the present disclosure, the cover opening/closing apparatus may increase the cover rotation angle by moving the rotation axis of the cover. The user may fully rotate the cover (e.g., 180 degrees) such that the cover is restrained by the other side of the case frame and cannot rotate further, and accordingly the opening may be improved. When the cover rotates over the threshold angle (e.g., 90 degrees), the rotation axis of the cover moves out of the case frame as not to block the torque based on a specific point. Thus, the breakage at or around the rotation axis may be prevented.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A cover opening and closing apparatus of an electronic appliance, the cover opening and closing apparatus comprising:
    a body comprising a container-shaped housing with an open side configured to insert and remove at least one electronic component;
    a cover configured to open and close an opening of the housing;
    a moving hinge hinged to the cover, received in the body, and movable; and
    a shaft,
    wherein, when the cover rotates over a threshold angle, a hinge connector between the cover and the moving hinge moves out of the body,
    wherein the moving hinge is received in a hinge housing of the body and slides along a round bottom of the hinge housing,
    wherein the shaft is received in the hinge housing,
    wherein the hinge housing comprises an open hole formed lengthwise in the movement direction of the moving hinge at either side standing upright from the bottom,
    wherein the moving hinge comprises a shaft hole penetrating either side,
    wherein the shaft penetrates the shaft hole, wherein either end of the shaft protrudes to either side of the moving hinge, and wherein the either end of the shaft is disposed in the open hole and guided by the open hole to move.

2. The cover opening and closing apparatus of claim 1, wherein the cover rotates on a rotation axis, the rotation axis being a protrusion formed in the body, and the hinge connector between the cover distal from the rotation axis and the moving hinge rotates on the rotation axis to move out of the body.

3. The cover opening and closing apparatus of claim 1, wherein the moving hinge comprises:

a pair of hinge arms bending in a circular shape along a movement direction and protruding in a gliding direction from either side.

4. The cover opening and closing apparatus of claim 3, wherein the cover comprises:

a hinge arm rotating between the hinge arms of the moving hinge.

5. The cover opening and closing apparatus of claim 1, further comprising:

a hinge cover coupled to an opening of the hinge housing, wherein the connection of the opening and the hinge cover forms a gate for entrance and exit of the hinge connector.

6. The cover opening and closing apparatus of claim 5, wherein a lower surface of the hinge cover near the gate contacts the moving hinge and is round.

7. The cover opening and closing apparatus of claim 1, wherein a guide groove formed lengthwise in the movement direction of the moving hinge is formed at a bottom of the hinge housing, the moving hinge comprises a guide protrusion inserted into the guide groove, and the guide protrusion moves under guidance of the guide groove.

8. The cover opening and closing apparatus of claim 1, wherein the ends of the shaft are in a cross-sectional shape partially following a path of the open hole of the hinge housing.

9. The cover opening and closing apparatus of claim 1, further comprising:

a tension spring received in the hinge housing, wherein the moving hinge comprises a spring connection groove communicating with the shaft hole with one open side, the hinge housing comprises a spring connection hook in a side, one end of the tension spring is secured to the shaft in the spring connection groove, and the other end of the tension spring is secured to the spring connection hook.

10. The cover opening and closing apparatus of claim 1, wherein a torsion spring is disposed in the hinge connector, and the cover is elastically supported by the torsion spring to rotate from the moving hinge.

11. The cover opening and closing apparatus of claim 1, further comprising:

a movable cam and a vertical cam disposed under the cover and moving straight toward different sides of the cover according to a cam motion, wherein the movable cam comprises a control portion of a certain height which vertically extends through the open hole penetrating the top and the bottom of the cover and moves on the open hole, the vertical cam is elastically supported by elastic supports extending to either side, the movable cam and the vertical cam comprise hooks moving on the cover according to the cam motion, and an opening of the housing comprises fixing grooves coupled to the hooks adequate positions.

12. The cover opening and closing apparatus of claim 1, wherein the threshold angle is 90 degrees.

13. The cover opening and closing apparatus of claim 1, wherein the cover rotates up to 180 degrees.

14. The cover opening and closing apparatus of claim 13, wherein, when the cover rotates 180 degrees, the cover contacts an outer surface of the body and does not rotate further.

15. The cover opening and closing apparatus of claim 1, wherein the at least one electronic component is a battery and/or a memory card.

16. The cover opening and closing apparatus of claim 1, wherein the cover gets narrow to the hinge connector.

17. The cover opening and closing apparatus of claim 1, wherein the electronic appliance is a digital camera.

18. A battery cover opening and closing apparatus of an electronic appliance, the battery cover opening and closing apparatus comprising:

a body comprising a container-shaped battery housing with an open top side, and a container-shaped hinge housing disposed beside the battery housing with an open top side;

a battery cover configured to open and close an opening of the battery housing, and lock the opening of the battery housing;

a hinge cover coupled to an opening of the hinge housing and forming a gate by joining the opening of the hinge housing;

a moving hinge hinged to the battery cover, the moving hinge gliding along a round bottom of the hinge housing, and bending circularly along a movement direction;

a first shaft configured to hinge-connect the battery cover and the moving hinge;

a second shaft penetrating the moving hinge, the second shaft protruding to either side of the moving hinge with either end, and disposed in parallel with the first shaft; and a tension spring secured to a spring connection hook formed in a side of the hinge housing with one end, and secured to the second shaft penetrating a spring connection groove opened to one side in the moving hinge with the other end, wherein the hinge housing comprises an open hole formed lengthwise in a movement direction of the moving hinge at either side standing upright from the bottom, either end of the second shaft is disposed in the open hole and moved under guidance of the open hole, and when the battery cover rotates over a threshold angle, the battery cover rotates on a rotation axis being a protrusion of the body, a hinge connector between the battery cover away from the rotation axis and the moving hinge rotates on the rotation axis and moves out through the gate, and the moving hinge connected to the hinge connector is moved according to tension of the tension spring.

\* \* \* \* \*